Nov. 26, 1968 H. J. ROSE 3,413,130
METHOD OF PREPARING AN EDIBLE TUBULAR COLLAGEN CASING
Filed June 28, 1965 2 Sheets-Sheet 2

HENRY J. ROSE
INVENTOR.

BY

HIS ATTORNEY

United States Patent Office 3,413,130
Patented Nov. 26, 1968

3,413,130
METHOD OF PREPARING AN EDIBLE TUBULAR COLLAGEN CASING
Henry J. Rose, Danville, Ill., assignor to Tee-Pak, Inc., Chicago, Ill., a corporation of Illinois
Filed June 28, 1965, Ser. No. 467,627
2 Claims. (Cl. 99—176)

ABSTRACT OF THE DISCLOSURE

An edible tubular collagen casing is prepared from collagen derived from limed animal hides and tanned or hardened with glutaraldehyde. Animal hides which are either fresh or salt-cured are treated with a lime-containing solution for a period of 3–12 hours to at least partially de-hair the hide. The hide is then mechanically split to remove the epidermal layer and remaining hair and the lime in the corium layer is removed by neutralization with a non-toxic acid and washing to remove by-product salts. The neutralized corium layer is ground at a temperature less than 20° C., swollen by treatment with acid, and formed into a dilute slurry which is extruded in tubular form. The extruded casing is coagulated in an ammonium sulfate coagulation bath and tanned by treatment with a 1–50% solution of glutaraldehyde at a pH of 4.0–7.0. The tanned or hardened casing is washed and dried to produce a translucent non-fibrous edible product.

Figure 1:
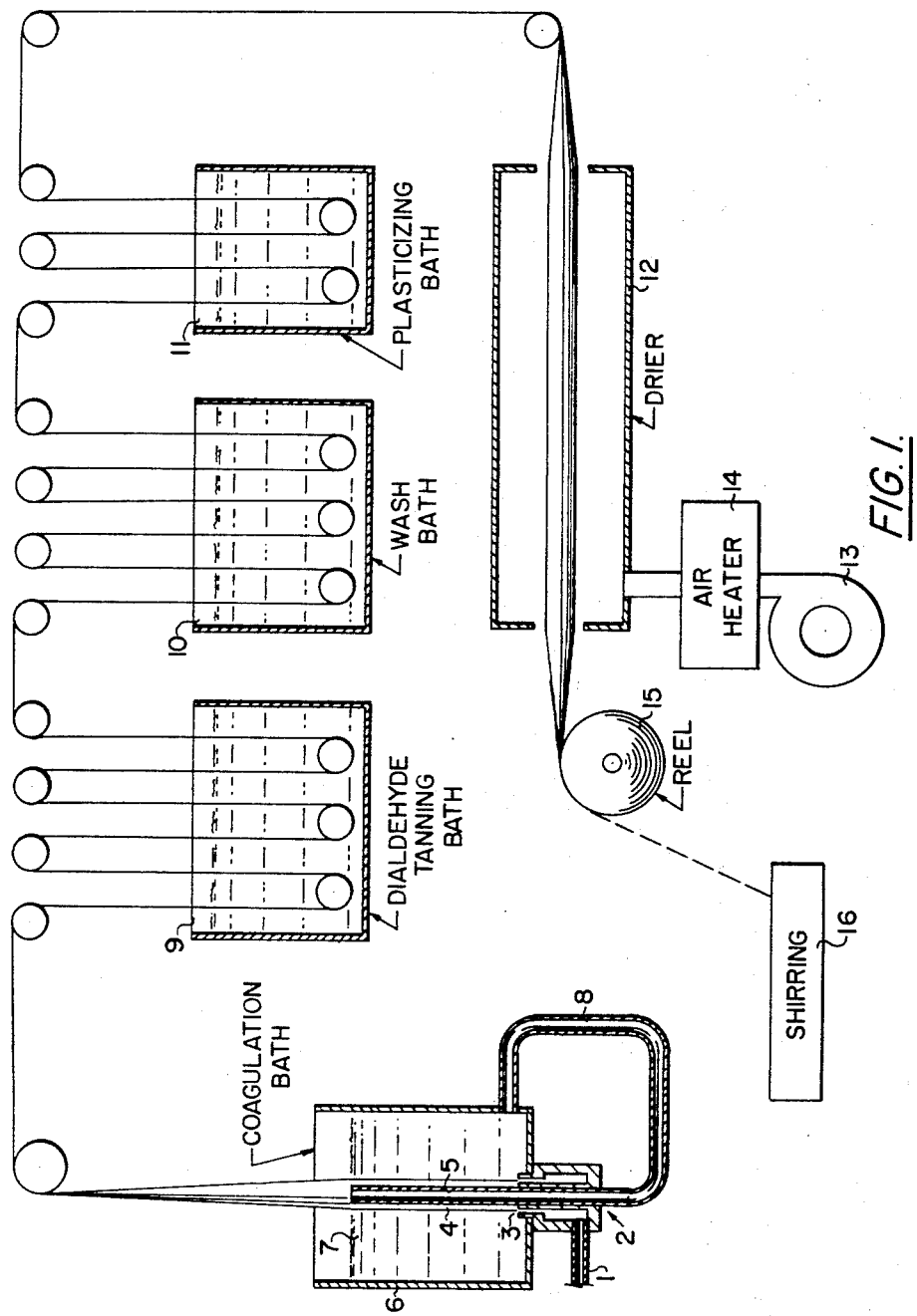

This invention relates to new and useful improvements in artificial sausage casings and more particularly to the production of artificial sausage casings from animal hide collagen in which the casings are tanned with an edible non-toxic dialdehyde, viz glutaraldehyde.

Natural casings are prepared from the intestines of various edible animals, primarily cattle and sheep. The intestines are removed from the slaughtered animal and are thoroughly cleaned by processes well known in the art. Natural casings, which have been thoroughly cleaned, are stuffed with various sausage meat compositions and formed into sausage links in preparation for cooking. The sausages which are thus formed are cooked by the consumer and the sausage casing eaten with the cooked sausage. In the preparation of certain smoked or precooked sausages, such as frankfurters and the like, the sausage is cooked or smoked or otherwise processed by the meat packer to render it edible without further treatment by the consumer.

Prior to about 1925, substantially all sausage casings were natural casings prepared from animal intestines. Since that time, there have been developed several types of synthetic sausage casings, primarily of regenerated cellulose, which are used in the preparation of the major portion of sausages which are made and sold today. Cellulose casings are used in the preparation of large sausages such as bolognas, salamis, and the like, and are removed from the sausage by the consumer at the time of final preparation for eating. Regenerated cellulose casings are also used in the preparation of frankfurter sausages wherein the casing is stuffed with sausage emulsion, linked, smoked, and cooked, and the casing removed from the finished sausage. Regenerated cellulose casings have not proved satisfactory for the processing of pork sausages inasmuch as cellulose is not edible with the sausage and does not transmit the fat which is released from the sausage during cooking. As a result, there has been some demand for an artificial sausage casing which is edible and which has the properties desired in a casing to be used in the processing of pork sausages.

Over a period of many years, synthetic sausage casings have been prepared from animal collagen. Casings made of collagen have been prepared by processing animal hides to break the collagen into a fibrous structure and extrude the collagen fibers in the form of a doughy mass to produce tubular casings. The casings which have been prepared in this manner have been hardened by treatment with formaldehyde and have been used as removable casings for processing various sausages. These casings have not been edible even though collagen itself is edible.

More recently, edible sausage casings of collagen have been prepared and sold in commercial quantities. In the manufacture of edible collagen casings, considerable emphasis has been placed upon the necessity for using collagen source materials which have not been subjected to a liming treatment. In fact, a number of recent patents describing the production of collagen casing have indicated that it is absolutely necessary to start with an unlimed collagen source material if an edible casing is to be obtained. While the use of unlimed collagen as a starting material has certain advantages, it has the substantial disadvantage of requiring a more severe mechanical treatment for removal of hair and the epidermal layer from the hides from which the collagen is obtained. In the co-pending patent application of Robert D. Talty and Mauj A. Cohly, Serial No. 442,885, filed Mar. 26, 1965, a process is described in which edible collagen casings are prepared from limed hide collagen.

In the preparation of edible collagen casings, hide collagen is converted into a finely divided fibrillar form and extruded in the form of a dilute collagen slurry. The extruded collagen is passed into a sodium sulfate and ammonium sulfate coagulating bath which dehydrates the collagen slurry and forms a coherent collagen film. At this stage in the processing, however, the salt-coagulated collagen film can be handled but will revert to a thin slurry upon contact with water. It is therefore necessary to harden or tan the extruded collagen film to permit further processing of the film and to provide the film with sufficient strength for use as a sausage casing. A satisfactory tanning process must utilize a tanning agent which acts rapidly, is completely nontoxic in the form in which it is present in the finished casing and must produce a casing of sufficient strength to be stuffed with sausage meat, linked, packaged, and finally cooked.

It is therefore one object of this invention to provide a new and improved process for the tanning or hardening of edible collagen casings.

A feature of this invention is the provision of an improved process for tanning or hardening edible collagen casings by treating an extruded collagen casing with an edible nontoxic dialdehyde, viz glutaraldehyde.

Other objects and features of this invention will become apparent from time to time throughout the specification and claims as hereinafter related.

This invention is based upon the discovery that satisfactory edible collagen casings can be prepared by extrusion of a collagen slurry into a suitable coagulating bath in conjunction with or followed by treatment of the extruded casing with glutaraldehyde to harden or tan the collagen film. The treated casing has a tensile strength suitable for further processing, stuffing, and cooking and has a shrinkage temperature as high or higher than that of native collagen. It is necessary in the preparation of edible collagen films for use as sausage casings to produce a film having as high a shrinkage temperature as possible to reduce the amount of shrinkage which occurs during the cooking of the stuffed casing.

Collagen tissues which are suitable for preparation of extruded collagen casings are obtainable from hide and tendon, although hide collagen is preferred for casing manufacture. Collagen is formed of a large number of fibers which in turn consist of a much greater number of fibrils of submicroscopic size. Collagen fibrils have a diameter of the order of 10 to 50 angstroms and lengths ranging from several thousand up to several million angstroms. Recent patents describing the production of edible collagen casings have emphasized the necessity of using collagen source materials which have not been subjected to a liming treatment for the reason that the liming treatment allegedly prevents the bursting of the collagen fibers to release the fibrils which is necessary for the formation of fibrillar films.

The novel tanning process of this invention is applicable to the tanning of extruded collagen casing prepared from either limed or unlimed animal hides as the source of collagen. If a limed hide is used as the source of collagen for the preparation of an edible casing, it is preferred that the procedure described in Cohly et al., Ser. No. 442,885, be followed, or that the hide be limed for a very short period of time and the entire procedure for converting the hide into an extrudable collagen slurry be carried out within a relatively short period of time, e.g., 36 hours or less.

If unlimed collagen is to be used in the preparation of an edible collagen casing, the unlimed hide, either fresh or frozen, is defleshed and the hair and epidermal layer mechanically removed, e.g., by abrading, scraping, splitting, etc. The hide is then cut into small pieces and passed through a meat grinder until reduced to a very small size. The grounded collagen is then swollen in a solution of an organic acid such as lactic acid or citric acid to produce a slurry having a 3–6% collagen content.

Collagen slurry is extruded through an annular die into a coagulating bath consisting of a concentrated solution of sodium sulfate or ammonium sulfate. The resulting tubular collagen film is then passed into a solution of an edible nontoxic dialdehyde, such as glutaraldehyde, for tanning, and then washed, dried, shirred, and packaged.

If the collagen used in the preparation of an edible casing is derived from limed animal hides some variation in the above procedure is required. An animal hide is treated to remove the blood quickly and then treated with a lime-containing solution for a time sufficient to at least partially dehair the hide. The hide is then neutralized by treatment with a nontoxic acid, at a pH of 2.5–6.5, to form soluble calcium salts. The neutralized hide is washed sufficiently to remove most of the by-product salts. The hide may be split or mechanically dehaired to remove the residual hair and epidermal layer either before or after neutralization. Next, the neutralized and washed hide is defleshed, cut into small pieces and then ground at a temperature less than about 20° C. into a finely divided form and mixed with sufficient water to produce a slurry having a collagen content of about 2–6%.

The collagen slurry is treated with a weak acid, preferably hydroxy acids such as citric acid or lactic acid to cause the collagen fibers to swell and burst thus releasing the collagen fibrils and destroying the identity of the individual fibers. The swollen collagen slurry is extruded through an annular die to form a collagen tube. The collagen tube which is formed by extrusion through the die passes into a coagulating bath containing a dehydrating and deswelling agent, such as sodium sulfate or ammonium sulfate.

In preparing the collagen as above described, there are certain features of the process which are quite critical. Fresh or salt-cured hides are used. The blood must be removed from the hide quickly and curing or liming started as soon as possible to prevent biological degradation of the hide. The liming for removal of hair is carried out as fast as possible. Liming periods of less than 4 days are used and periods of 3 to 12 hours or less are preferred. Even after curing or liming the hide must be processed quickly. In general, the hide must be finally converted into a collagen slurry in less than 15 days.

In preparing the hide, it is preferred that the limed hide pieces be treated with a solution of a nontoxic acid capable of forming soluble calcium salts at a pH of 2.5–6.5, as described in Talty et. al., U.S. patent application Ser. No. 442,885.

After the hide has been delimed and washed and ground into very small particles to produce a slurry, it is treated with an acid such as citric acid or lactic acid to adjust the pH to a range of 2.5–3.7 thus causing the collagen to swell and the fiber bundles to burst. The mass of collagen in the slurry is preferably maintained at a value in the range from about 2–6%, preferably about 3.5–5%. The slurry is extruded through an annular die into a coagulating salt bath, as described above, which may contain a tanning agent or be subsequently treated with a solution of a dialdehyde to tan the collagen product.

Figure 2:
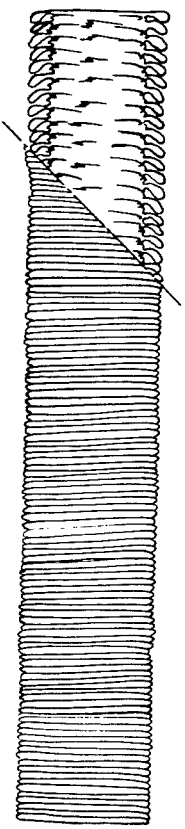
Figure 3:
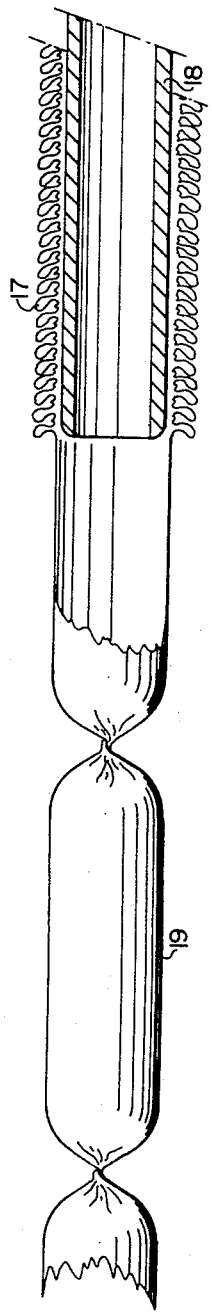

The process for the preparation and tanning of collagen casings in accordance with this invention will be understood more fully by reference to the following description and the accompanying drawings, in which:

FIG. 1 is a flow diagram illustrating schematically the more important steps in the extrusion, tanning, and processing of edible collagen casings, FIG. 2 is an extruded edible collagen casing prepared in accordance with this invention as processed in a shirred form, and FIG. 3 is a schematic view showing the filling of the casing with sausage meat on an extrusion horn or nozzle and the preparation of sausage links therefrom.

In a preferred form of the process, animal hides are cut into suitable pieces (hide trimmings may also be used) and are treated with a suitable lime solution for removal of hair. The hide may also be limed before cutting into small pieces. The lime bath (sometimes referred to as a liming solution) is preferably a slurry of solid lime [$Ca(OH)_2$], sodium sulfhydrate [$NaSH$], and dimethylamine sulfate [$((CH_3)_2NH_2)_2SO_4$]. After treatment in such a solution for a period of up to 4 days (3 to 12 hours or less is preferred), the hides are removed and washed. The hide is treated with an acid as described above and subjected to repeated squeezing and soaking in water to wash out the soluble by-product salts which are formed. After neutralization, the hides are split or otherwise mechanically abraded to remove the epidermal layer and any remaining hair. Alternatively, the acid neutralization step may be omitted if the entire process for conversion of hide to a collagen slurry is carried out in a sufficiently short period of time. Also, as previously noted, it is possible to use unlimed hides as a source of collagen for this process.

The hides which are thus prepared are ground into particles of very small size to produce an aqueous slurry having a collagen content in the range from about 2–6%, preferably about 3.5–5%. The collagen is maintained at a temperature less than about 20° C. (preferably less than 10° C.) during the grinding by repeated addition of ice to the mixture. The collagen slurry which is thus prevented is treated with a dilute solution of weak acid to swell and burst the collagen fibers as previously described. The swollen collagen slurry is then extruded through an annular die to produce a thin-walled tubular product suitable for use as sausage casings after tanning and further processing. In order to obtain maximum strength in the product casing, the collagen slurry is preferably extruded through a die having rotating inner and/or outer parts which is well known in the prior art in the preparation of collagen casings, vide Becker U.S. Patent 2,046,541.

The collagen slurry is extruded through the die into a coagulating bath consisting of a concentrated solution of sodium sulfate or ammonium sulfate, which may, if desired, include up to 5% glutaraldehyde. The thin-walled collagen tube which is formed in the coagulating bath is then passed into a tanning bath, viz a solution of glutaraldehyde, and subsequently washed and plasticized. The casing which is thus prepared is inflated with air or other gas and passed through a dryer. From the dryer, the casing is either rolled up on reels or is passed on to a shirring machine where it is shirred into short strands as illustrated in FIG. 2 of the drawings. It is preferred to shirr the casing directly from the dryer since it is easier to maintain the casing in an inflated state. The casing may be shirred on shirring machines of the type used in shirring cellulosic casings, vide Blizzard et al., U.S. Patent 2,722,714; 2,722,715; 2,723,201; or Ives U.S. Patent 3,122,517.

In FIG. 1 of the drawings, the steps from extrusion through reeling or shirring are illustrated schematically in slightly more detail. The collagen slurry is introduced through inlet conduit 1 into die 2 having an annular die outlet 3 through which casing 4 is extruded. The die 2 has an inner tube 5 which extends upwardly within the extruded casing to remove coagulating bath from within the extruded casing. The die 2 is located at the bottom of container 6 which contains coagulating bath 7. Coagulating bath 7 is circulated through conduit 8 from tube 5 for removal of the coagulating bath from inside the extruded casing. Casing 4 which is coagulated in the bath 7 passes over a series of rollers and is directed through a tanning bath 9.

Tanning bath 9 consists of an aqueous solution of a nontoxic edible dialdehyde, preferably glutaraldehyde. The concentration of dialdehyde in the solution may range from a fraction of 1% up to 50%, concentrations of about 1–20% being preferred. The solution is preferably buffered to a pH of about 4–7 with an inert buffer salt, e.g. sodium formate, sodium citrate, or sodium hexametaphosphate.

From the tanning bath 9, the casing passes through a wash bath 10 where unreacted tanning reagents are washed out of the casing. The casing is then passed through plasticizing bath 11 which introduces a small amount of a plasticizer such as glycerine into the casing. From the plasticizing bath 11, the casing passes through dryer 12 where it is inflated and dried with the aid of air circulated by fan or blower 13 through air heater 14. After leaving dryer 12, the casing may be rolled up on reel 15, but is preferably passed directly to a shirring machine shown diagrammatically as 16. If the casing is first rolled up on reels it may be subsequently shirred if desired. The shirring machine which is used for preparation of shirred strands of casing may be of any suitable design such as the types commonly used in the shirring of regenerated cellulose sausage casings as noted above.

After the casing is shirred into individual short strands, it is packaged and cured by heating at 60–80° C. in an atmosphere of 20–50% relative humidity for several hours prior to shipment to the meat packer. In FIG. 3 the stuffing of the casing is illustrated. A strand of edible tanned collagen casing 17 is placed on a tubular stuffing horn 18 which is connected to a pressurized source of sausage emulsion (not shown). The sausage emulsion is passed through the stuffing horn 18 into the end of casing 17 and the casing is filled with sausage meat and twisted at suitable intervals to provide sausage links 19. The links may be severed from each other and packaged in a suitable overwrap following conventional meat packaging techniques. When the sausage is cooked by the consumer, the casing is found to be quite strong and shrinks with the meat during cooking. The casing may be prestuck, if desired, to permit more rapid release of fat during the cooking of the sausages. Casing which is prepared in this manner has been found to have a shrinkage temperature which is equal to or greater than native collagen and thus does not shrink excessively during cooking.

The following nonlimiting examples are illustrative of the application of this invention in the preparation of a satisfactory edible dialdehyde-tanned collagen casing:

Example 1

In this example, the preparation of edible collagen casings from limed animal hides with dialdehyde tanning is illustrated. Fresh heifer hides were limed for a period of 3 hours at 10° C. in a liming solution equal to 300% of the weight of the hide being treated. The solution contained 5% lime, 1% sodium sulfhydrate, and 3% dimethylamine sulfate based on the weight of hide treated. At the end of the 3-hour treatment, the hair was substantially loosened and partially removed.

The hide was defleshed and then neutralized by soaking overnight in a dilute solution (pH 5) of lactic acid. This treatment is effective to completely neutralize excess lime present in the hide and convert the lime into soluble calcium salts which are removed by washing. After neutralization, the hide was split to remove the remaining hair and epidermal layer. Next, the limed and neutralized hide splits were cut into small square or rectangular sections, e.g. ¼–4 inches on a side and then repeatedly soaked in water and squeezed in a food press to remove the soluble calcium salts.

The small pieces of treated hide were converted to a fine pulp by successive passes through a meat grinder. In this grinding operation, sufficient ice was mixed with the hide splits to maintain the temperature below about 20° C. Successive passes through the meat grinder used successively smaller dies, the smallest being ³⁄₆₄ inch. At this point, sufficient water was added to the pulp to produce a mixture consisting of about 90% water and 10% collagen.

This collagen pulp was then treated with sufficient dilute lactic acid to produce a pH of 2.5–3.7. After thorough mixing, the pulp and acid were stored overnight at a temperature of 3° C. to swell. At the end of this time, the collagen had swollen and taken up all of the water in the slurry. The swollen collagen was mixed with additional water and acid to produce a thin homogeneous paste consisting of 4% collagen and 1.2% lactic acid (to maintain a pH of 2.5–3.7). This paste was further homogenized, filtered to remove any solid contaminants, and deaerated.

The slurry was then pumped under pressure through the extrusion die as previously described into a coagulating bath consisting of 42% ammonium sulfate (sodium sulfate can also be used) and 0–5% glutaraldehyde in water. When the collagen is extruded as a thin-walled tube into this concentrated solution of ammonium sulfate, the collagen fibrils are dehydrated and collapse to form a film which is sufficiently coherent for further processing. As shown in FIG. 1 of the drawings, the coagulation bath is circulated both inside and outside the tube to maintain the tube in an inflated condition and insure proper coagulation of the casing both on the inside and outside.

After the film is coagulated in the ammonium sulfate solution (at a temperature of 10°–30° C.), it is necessary to tan the film to give the film sufficient strength for further processing and for stuffing with sausage meat. If the film were taken from the ammonium sulfate coagulating bath and were dried, a film would be produced which has moderate strength in the dry state which would revert to a paste upon contact with water. It is therefore necessary for the casing to be tanned or hardened to provide the wet and dry strength in the finished product required in an edible casing.

From the coagulation bath, the casing next passes into a tanning bath (maintained at 10°–30° C.) which comprises a 5% aqueous solution of glutaraldehyde buffered to pH 5.3 with sodium hexametaphosphate. In this bath, the casing is hardened or tanned. The casing passes over a series of rollers in the glutaraldehyde solution to provide multiple passes giving a residence time of at least 1 minute in the bath.

From the tanning bath, the casing then passes into a wash bath where it is maintained for a period of about 10 minutes by a multiple pass arrangement. After washing, the casing passes through a plasticizing bath consisting of 5% glycerine in water. From the plasticizing bath the casing passes through a dryer where it is inflated with compressed air and dried by circulation of heated air over the surface of the inflated casing. The casing was dried by air maintained at a temperature of 70° C. circulated at a rate of 200 feet per minute.

After drying, the casing is preferably shirred (since this permits introduction of air to maintain the casing inflated in the dryer) or may be first reeled and then shirred prior to packaging.

The tanning of the casing with glutaraldehyde solution was effective to produce a strong coherent film of collagen fibrils having a high longitudinal and transverse strength, both dry and rewet. The casing had a shrink temperature of about 65° C., as compared to the shrinkage temperature of 58° C. for native collagen. It should be noted that the shrinkage temperature of the tanned collagen film is to a large extent a measure of the shrinkage which will occur when a collagen casing is stuffed with sausage meat and subsequently cooked. The higher the shrink temperature, the less severe is the shrinkage during cooking. In fact, this casing had less tendency to split during cooking than casings tanned by other prior art processes.

Casings made by the above described method are uniform in diameter and wall thickness. The casing is formed of a smooth film which is substantially free of collagen fibers of macroscopic size. The casing film is translucent and apparently formed of collagen fibrils that are essentially randomly oriented. The orientation of collagen fibrils in the film and the resulting relative variation in longitudinal and transverse strength is largely a function of the conditions of extrusion and the type of extruder used.

The casing prepared as described above could be shirred without difficulty using a shirring machine of the type used for the shirring of regenerated cellulose casing. The shirred casing could be stuffed, linked, and cooked without difficulty.

Example 2

In this example, another preparation of edible collagen casings from limed animal hides with dialdehyde tanning is illustrated. Fresh heifer hides are limed for a period of 6 hours at 10° C. in a liming solution equal to 400% of the weight of the hide being treated. The solution contains 5% lime, 1% sodium sulfhydrate, and 3% dimethylamine sulfate based on the weight of hide treated. At the end of the 6-hour treatment, the hair is substantially loosened and partially removed.

The hide is defleshed and then neutralized by soaking overnight in a dilute solution (pH 5) of lactic acid. This treatment is effective to completely neutralize excess lime present in the hide and convert the lime into soluble calcium salts which are removed by washing. After neutralization, the hide is split to remove the remaining hair and epidermal layer. Next, the limed and neutralized hide splits are cut into small square or rectangular sections, e.g., ¼–4 inches on a side and then repeatedly soaked in water and squeezed in a food press to remove the soluble calcium salts.

The small pieces of treated hide are converted to a fine pulp by successive passes through a meat grinder. In this grinding operation, sufficient ice is mixed with the hide splits to maintain the temperature below about 20° C. Successive passes through the meat grinder use successively smaller dies, the smallest being ³⁄₆₄ inch. At this point, sufficient water is added to the pulp to produce a mixture consisting of about 90% water and 10% collagen.

The collagen pulp is then treated with sufficient dilute lactic acid to produce a pH of 2.5–3.7. After thorough mixing, the pulp and acid are stored overnight at a temperature of 3° C. to swell. At the end of this time, the collagen has swollen and taken up all of the water in the slurry. The swollen collagen is mixed with additional water and acid to produce a thin homogeneous paste consisting of 4% collagen and 1.2% lactic acid (to maintain a pH of 2.5–3.7). This paste is further homogenized, filtered to remove any solid contaminants, and deaerated.

The slurry is then pumped under pressure through the extrusion die as previously described into a coagulating bath consisting of 35% ammonium sulfate (sodium sulfate can also be used) in water. When the collagen is extruded as a thin-walled tube into this concentrated solution of ammonium sulfate, the collagen fibrils are dehydrated and collapse to form a film which is sufficiently coherent for further processing. As shown in FIG. 1 of the drawings, the coagulation bath is circulated both inside and outside the tube to maintain the tube in an inflated condition and insure proper coagulation of the casing both on the inside and outside.

From the coagulation bath, the casing next passes into a tanning bath which comprises a solution of 25% glutaraldehyde buffered to an initial pH of 5.7 with sodium formate. In this bath, the casing is hardened or tanned. The casing passes over a series of rollers in the glutaraldehyde solution to provide multiple passes giving a residence time of at least 1 minute in the bath.

From the tanning bath, the casing then passes into a wash bath where it is maintained for a period of about 10 minutes by a multiple pass arrangement. After washing, the casing passes through a plasticizing bath consisting of 5% glycerine in water. From the plasticizing bath the casing passes through a dryer where it is inflated with compressed air and dried by circulation of heated air over the surface of the inflated casing. The casing is dried by air maintained at a temperature of 70° C. circulated at a rate of 200 feet per minute.

After drying, the casing is preferably shirred (since this permits introduction of air to maintain the casing inflated in the dryer) or may be first reeled and then shirred prior to packaging.

Casing which is prepared in this manner is superior in stuffing and cooking properties. The tanning of the casing with glutaralydehyde solution is effective to produce a strong coherent film of collagen fibrils having a high longitudinal and transverse strength, both dry and rewet. The casing has a shrinkage temperature of about 64° C., as compared to the shrinkage temperature of 58° C. for native collagen. It should be noted that the shrinkage temperature of the tanned collagen film is to a large extent a measure of the shrinkage which will occur when a collagen casing is stuffed with sausage meat and subsequently cooked. The casing is found to have a very low tendency to split during cooking.

Casings made by the above described method are uniform in diameter and wall thickness. The casing is formed of a smooth film which is substantially free of collagen fibers of macroscopic size. The casing film is translucent and apparently formed of collagen fibrils that are essentially randomly oriented. The orientation of collagen fibrils in the film and the resulting relative variation in longitudinal and transverse strength is largely a function of the conditions of extrusion and the type of extruder used.

The casing prepared as described above could be shirred without difficulty using a shirring machine of the type used for the shirring of regenerated cellulose casing. The shirred casing could be stuffed and linked without difficulty.

What is claimed is:
1. A method of preparing an edible tubular collagen casing which consists of
   treating an animal hide selected from the group consisting of fresh hides and salt-cured hides with a lime-containing solution for a time, in the range from 3–12 hours, sufficient to at least partially dehair the hide,
   mechanically removing the epidermal layer and remaining hair,
   neutralizing the lime in the hide by treatment with a nontoxic acid capable of forming a soluble calcium salt at a pH of 2.5–6.5, and washing to remove by-product salts,
   defleshing the hide and cutting the hide into pieces, grinding the hide pieces at a temperature less than about 20° C. to produce a slurry of finely-divided collagen in water, treating the slurry with an acid at a pH of 2.5–3.7 to swell the collagen and adjust the collagen content of the slurry to the range of 2–6%, extruding the slurry through an annular die to form a collagen tube, immersing the tube in a coagulating bath, tanning the collagen tube by contacting the same with a 1–50% aqueous solution of glutaraldehyde at a pH of 4.0–7.0, and washing, plasticizing, and drying the tube to produce a translucent non-fibrous edible product.

2. A method as defined in claim 1 in which the coagulating bath is a concentrated solution of ammonium sulfate or sodium sulfate containing up to 5% glutaraldehyde.

References Cited

UNITED STATES PATENTS

| | | |
|---|---|---|
| 2,852,812 | 9/1958 | Braun. |
| 2,896,254 | 7/1959 | Braun. |
| 2,971,814 | 2/1961 | Seligsberger. |
| 3,071,477 | 1/1963 | Klevens _____ 99—176 |
| 3,123,653 | 3/1964 | Lieberman. |
| 3,235,641 | 2/1966 | McKnight. |
| 3,269,851 | 8/1966 | Tu. |

HYMAN LORD, *Primary Examiner.*